W. P. POSTELL & J. F. HEARD, Jr.
FLUID TRANSMISSION AND CLUTCH.
APPLICATION FILED JAN. 31, 1917.
1,261,287.
Patented Apr. 2, 1918.
4 SHEETS—SHEET 2.
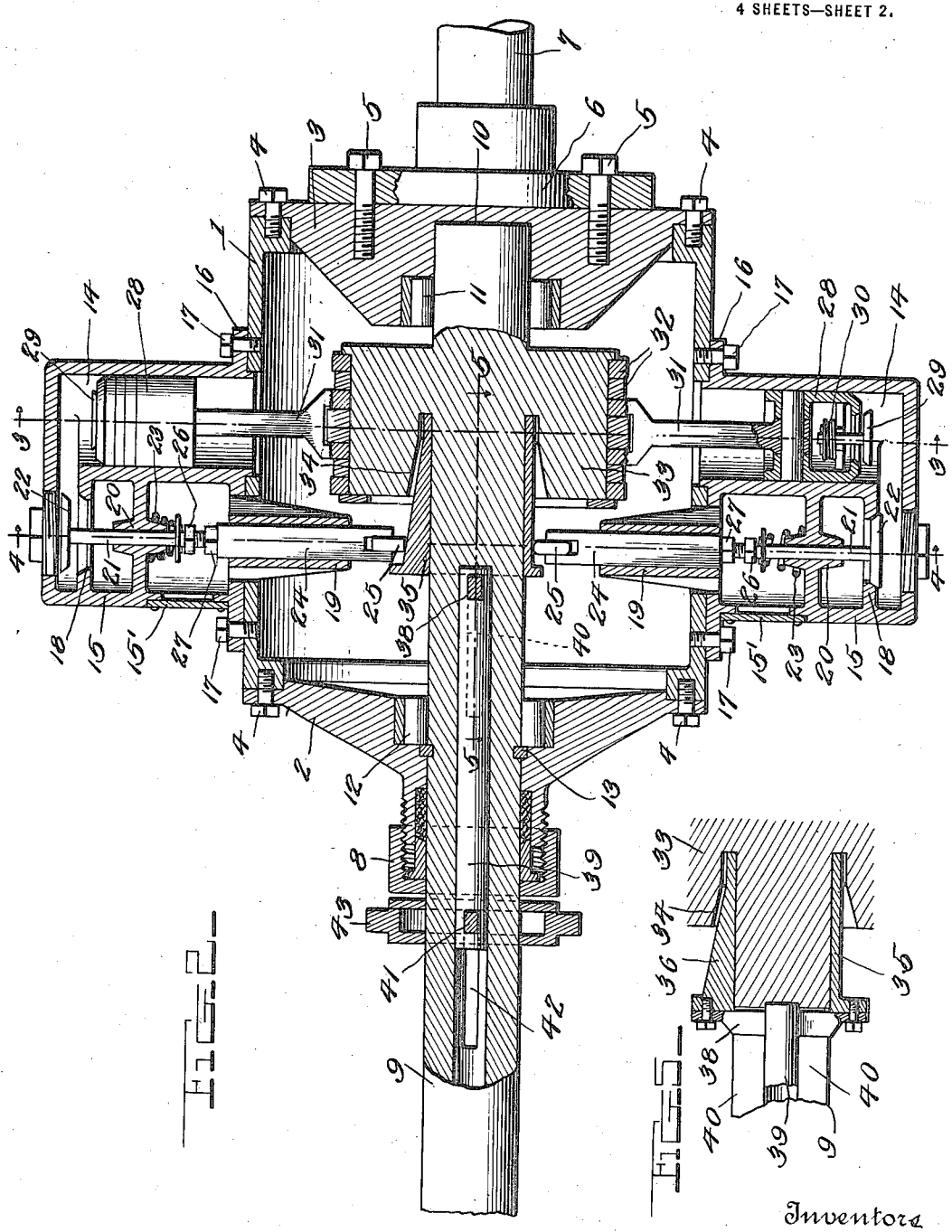
Witness
J. R. Pierce
Inventors
W. P. Postell and
J. F. Heard Jr.
By H. B. Willson & Co.
Attorneys

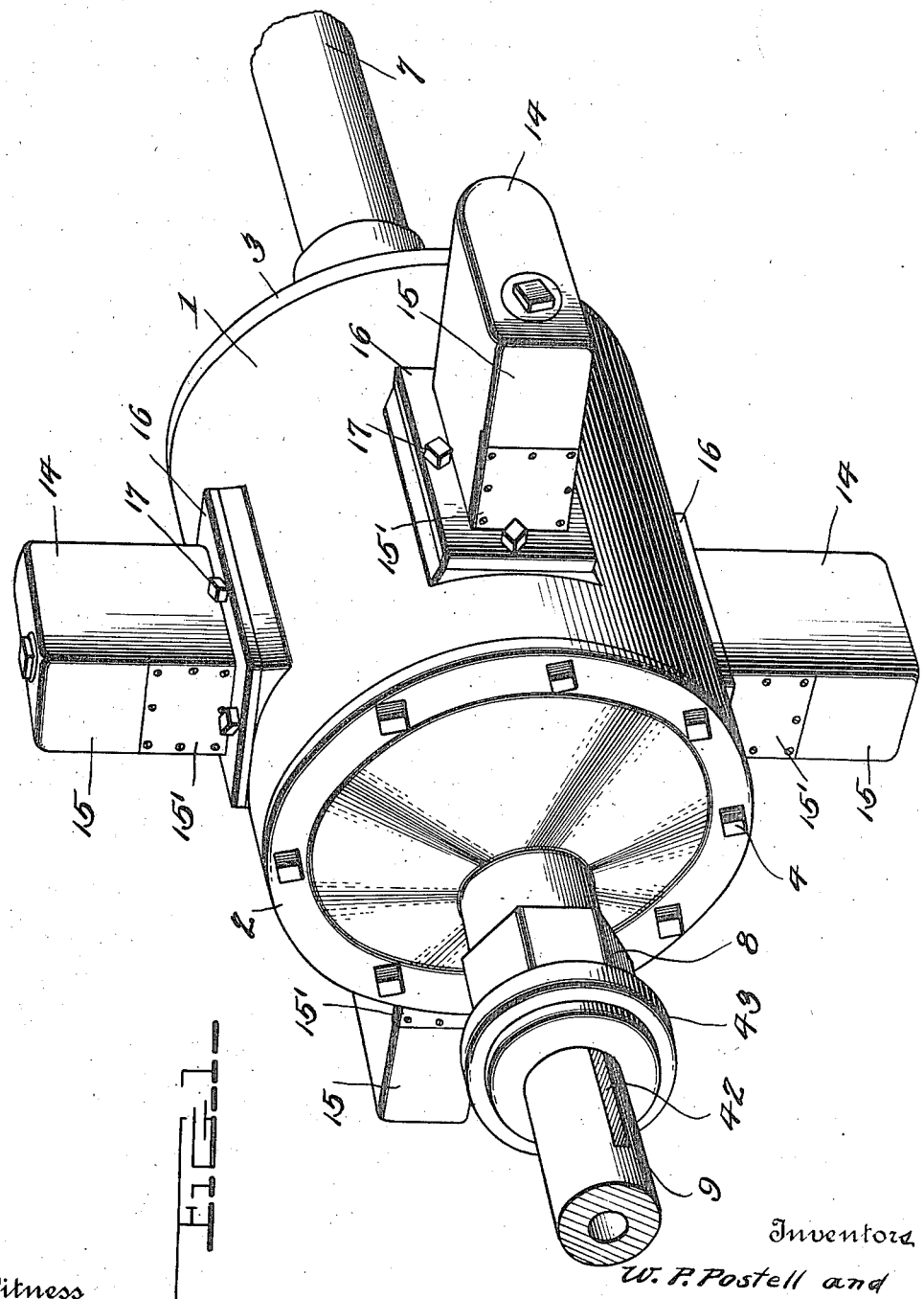

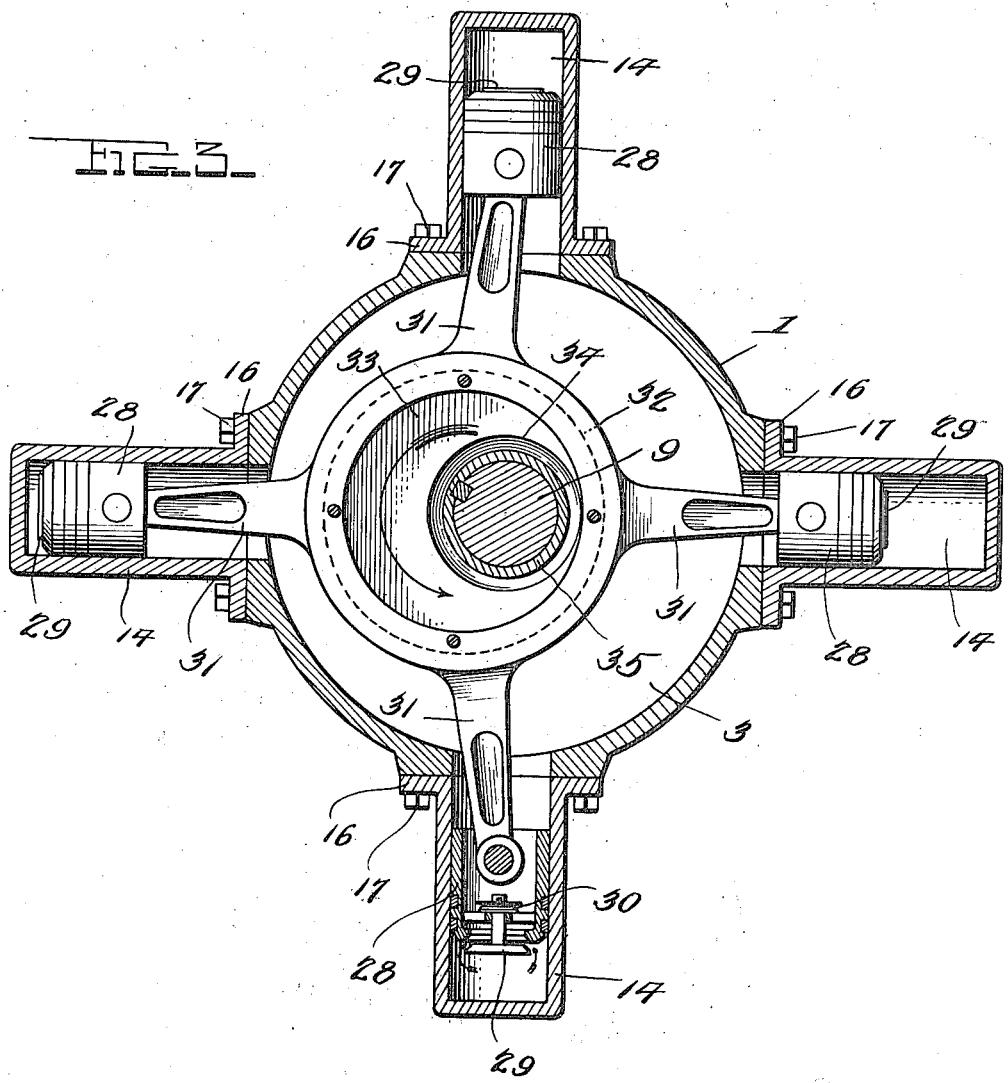

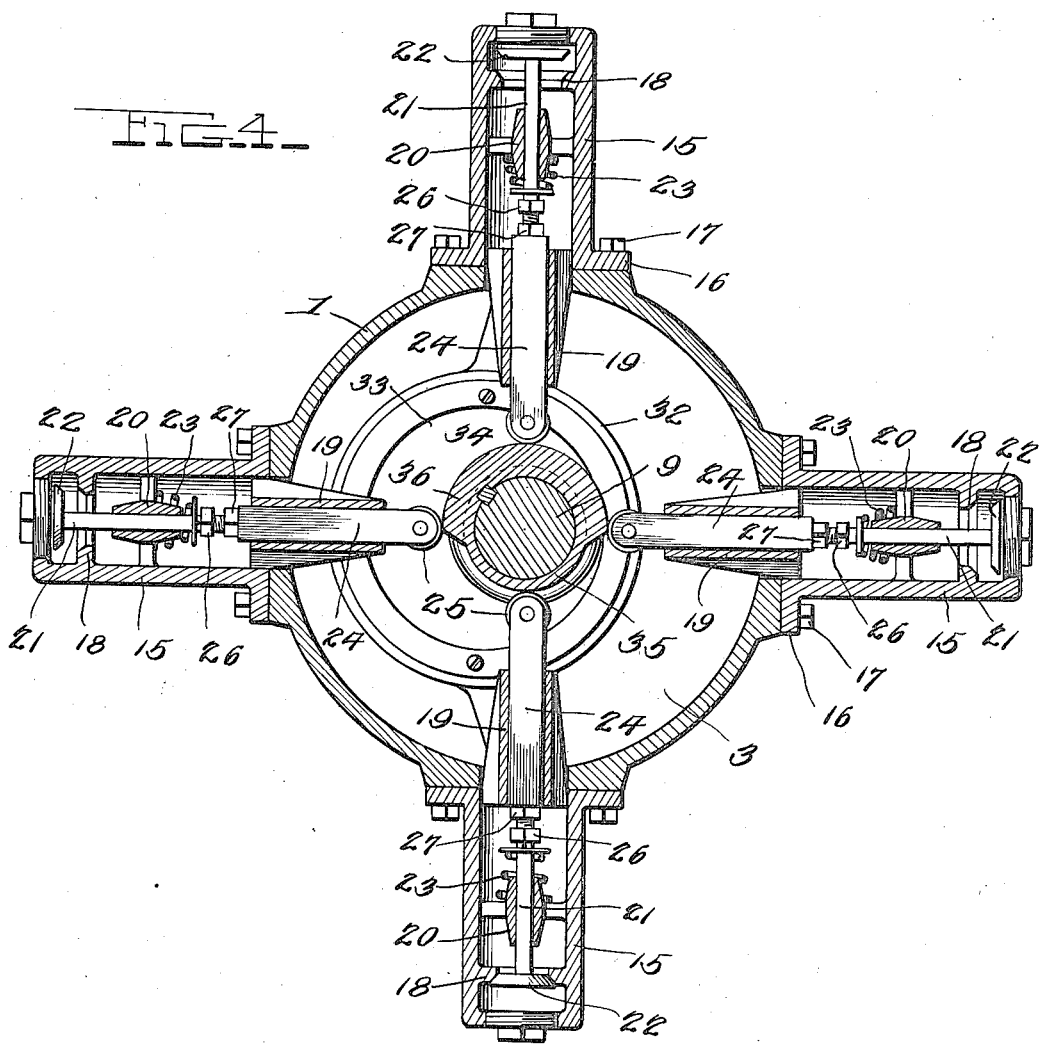

UNITED STATES PATENT OFFICE.

WILLIAM PIERCE POSTELL AND JACOB FOREMAN HEARD, JR., OF MACON, GEORGIA.

FLUID TRANSMISSION AND CLUTCH.

1,261,287. Specification of Letters Patent. Patented Apr. 2, 1918.

Application filed January 31, 1917. Serial No. 145,719.

*To all whom it may concern:*

Be it known that we, WILLIAM PIERCE POSTELL and JACOB FOREMAN HEARD, Jr., citizens of the United States, residing at Macon, in the county of Bibb and State of Georgia, have invented certain new and useful Improvements in Fluid Transmissions and Clutches; and we do declare the following to be a full, clear, and exact description of the invention, such as will enable others skilled in the art to which it appertains to make and use the same.

Our invention relates broadly to the transmission of power and more particularly to improved mechanism for accomplishing this result by means of cylinders, pistons working therein, and fluid which may either be trapped in the cylinders to prevent movement of the pistons or discharged therefrom to allow said pistons to move slowly or rapidly as occasion may demand.

The object of the invention is to provide a transmission of the class set forth which will be simple and compact yet highly efficient, being so constructed as to eliminate the necessity of a clutch and yet cause the driving shaft to pick up the load gradually.

With the foregoing general object in view, the invention resides in certain novel features of construction and unique combinations of parts to be hereinafter fully described and claimed, the descriptive matter being supplemented by the accompanying drawings which constitute a part of this application and in which:

Figure 1 is a perspective view of the improved transmission;

Fig. 2 is a central longitudinal section thereof;

Fig. 3 is a vertical transverse section on the plane of the line 3—3 of Fig. 2, showing more particularly the arrangement of pistons and cylinders;

Fig. 4 is a view similar to Fig. 3, but cut on the plane of the line 4—4 of Fig. 2, illustrating primarily the exhaust valves and the operating means therefor;

Fig. 5 is a detail horizontal section on the plane of the line 5—5 of Fig. 2, showing more particularly the valve operating collar and its cam.

In the drawings above briefly described, the numeral 1 designates a cylindrical casing having its ends closed by heads 2 and 3 secured thereto by machine screws or the like 4. The head 3 is secured by machine screws 5 or in any other preferred manner to a coupling flange 6 on the rear end of a drive shaft 7 which will be the crank shaft of the motor if the improved transmission is employed on motor vehicles, it being for this purpose that the invention is primarily designed, although it may well be used in other relations.

The head 2 carries a stuffing box 8 and a transmission shaft 9 extends rotatably through said box into the casing 1 along the axis of the latter, the inner end of said shaft being received in a socket 10 in the enlarged central portion of the head 3, said portion by preference having ball or roller bearings 11 for the shaft as shown clearly in Fig. 2. Similar bearings 12 are provided in the head 2 and a thrust collar 13 is preferably employed adjacent these bearings to prevent endwise shifting of the shaft 9 in an outward direction, movement of said shaft in the opposite direction being resisted by the bottom of the socket 10.

A plurality of cylinders 14 radiate from the casing 1, each cylinder having cast *en bloc* therewith an exhaust valve housing 15, each cylinder and housing having an outstanding flange 16 at its inner end through which screws 17 pass to secure these parts to the casing. The outer ends of the housings 15 are provided with exhaust valve seats 18 while the inner ends thereof are equipped with integral tubular guides 19 which extend into the casing 1, the intermediate portions of said housings having other guides 20. The stems 21 of exhaust valves 22 are slidably mounted in the guides 20, said valves being normally closed by coiled springs 23. Push rods 24 are slidably mounted in the guides 19 and at their inner ends carry anti-friction rollers 25 while their outer ends are equipped with the usual adjusting screws 26 for engagement with the stems 21 to operate the latter, nuts 27 being threaded on said screws to lock them in adjusted position. By means yet to be described, the push rods 24 are operated once during each revolution of the transmission so as to open the exhaust valves 22. For gaining access to the adjusting screws 26, each housing 15 is preferably provided with a detachable plate 15'.

Pistons 28 are mounted in the cylinders 14 and are equipped with spring closed valves 29 which permit the entrance of fluid from the casing 1 into the cylinders as said pistons recede, said valves then closing due to the action of their springs 30. The pistons 28 are carried on the outer ends of connecting rods 31 having eccentric bands 32 mounted on an eccentric 33 which may either be cast integral with the shaft 9 or secured thereon in any preferred manner. By this arrangement it will be seen that relative rotation of the shaft 9 and casing 1 will cause the pistons to reciprocate.

An annular recess 34 is formed in one end of the eccentric 33 and extends around the shaft 9, said recess receiving one end of a sliding collar 35 which is keyed on the shaft 9. This collar is formed with a tapered cam 36 having one end spaced inwardly from the aforesaid end of the collar. This end of the cam merges into the periphery of the collar while the other end thereof is spaced a considerable distance from said periphery as shown clearly in Fig. 5. It will thus be clear that when the collar 35 is moved outwardly so that the rollers 25 travel on the inner end thereof, the push rods 24 will not be operated to open the exhaust valves 22. This is the normal working position of parts. When, however, the collar 35 is shifted inwardly, the cam 36 will open each exhaust valve once during each revolution, the amount of opening being determined by the height of the part of cam 36 brought into play, it being obvious that any part of said cam may be made to operate upon the rollers 25 by shifting the collar 35 the required amount. For shifting the collar 35 as required, the means now to be described is preferably employed.

An elongated head 38 on the inner end of an operating rod 39 is secured at its ends to the outer end of the collar 35 in any preferred manner, said rod being slidable in a central bore formed in the shaft 9 while the head 38 is received in longitudinal slots 40 extending from said bore through the periphery of said shaft. A second elongated head 41 is carried by the outer end of the rod 39 and projects in opposite directions from the shaft 9 through longitudinal slots 42 therein, the ends of said head 41 being connected in any preferred manner with a collar 43 which is slidable on the shaft. Any of the well known mechanisms operated by a food pedal such as that commonly used for clutches, may be employed for coöperation with the collar 43 to shift the same in one direction or the other, means of this class being too well known to here require illustration.

The operation is as follows, assuming that the transmission is employed upon an automobile and that the latter is at a standstill. The collar 35 is then positioned as shown in Fig. 2 and thus as the engine shaft 7 turns the casing 1, the pistons 28 will meet with little or no resistance since the fluid (preferably oil) admitted into the cylinders 14 through the valves 29, will be freely expelled through the exhaust valves 22 when the latter are opened to the maximum by the cam 36. In starting the car, the control mechanism above described is actuated so as to permit the collar 35 to slide slowly toward the rear end of the shaft 9, the engine continually driving the casing 1. The effect is that the exhaust valves 22 will be gradually closed so that the fluid from the cylinders 14 meets with an increasing resistance and finally is forced against the exhaust valves when the latter have closed. The result is that a driving connection is established between the two shafts, which connection will remain constant until collar 35 is again shifted so as to cause the valves 22 to be opened a greater or less extent. When the valves 22 are partially closed, shaft 7 will make a number of revolutions to one revolution of shaft 9 but as said valves are closed, the speed of the two shafts gradually becomes the same so that the car will start smoothly and with no sudden strain on the driving mechanism with which the shaft 9 will be connected.

The invention, due to the fact that it controls the relative speed of the shafts 7 and 9 and finally locks said shafts to rotate together, takes the place of the usual variable speed transmissions as well as the clutches of automobiles or other machines upon which it may be used. Since the construction shown accomplishes these results effectively, it constitutes the preferred form of the transmission but it is to be understood that within the scope of the invention as claimed, numerous changes may be made without sacrificing the principal advantages.

We claim:

1. A fluid transmission comprising a fluid-tight casing to be secured to a rotating body, a shaft extending rotatably into said casing and provided with an eccentric having in one end an annular recess extending around said shaft, a plurality of pistons having means mounted on said eccentric, fixed cylinders carried by the casing and receiving said pistons, valves for admitting fluid from the casing into said cylinders as the pistons recede, normally closed exhaust valves from said cylinders into the casing, a sliding collar on the shaft for controlling said exhaust valves, said collar being movable into said annular recess, and means for sliding said collar to operative and inoperative positions.

2. A fluid transmission comprising a casing to be secured to a rotating body, a shaft passing rotatably into said casing on the axis thereof, a plurality of cylinders radiating from said casing and each having an exhaust valve housing equipped with a tubular guide extending into the casing, exhaust valves in said housings for controlling the passage of fluid from the cylinders into the casing, said valves having push rods slidable in said guides, means on the shaft for operating said push rods, pistons connected eccentrically with said shaft and received in said cylinders, and valves for admitting fluid from the casing into the cylinders as the pistons recede.

3. In a fluid transmission and clutch, the combination of a rotary casing, a shaft passing rotatably through one end of said casing, the inner end of said shaft having an eccentric, a plurality of radially disposed cylinders carried by said casing and rigidly secured thereto, pistons slidable in said cylinders and having means mounted on said eccentric, intake valves for admitting fluid from said casing into said cylinders as the pistons move inwardly, exhaust valve housings extending along one side of said cylinders and each having a valve seat, a valve stem guide, and a push rod guide, exhaust valves in said housings and engaging said seats, the stems of said valves being slidably mounted in said stem guides, push rods mounted slidably in said push rod guides for operating said stems to open said exhaust valves, a cam mounted slidably on the shaft for actuating said push rods, and means for sliding said cam to operative and inoperative position.

4. In a fluid transmission and clutch, the combination of a rotary casing, a shaft passing rotatably through one end of said casing, cylinders carried by the casing, pistons having means mounted eccentrically on said shaft, said pistons coöperating with said cylinders in forming a fluid connection between the shaft and casing, intake valves for admitting fluid from said casing into said cylinders as the pistons move inwardly, exhaust valves from said cylinders, a collar slidable along the shaft and having means for operating said exhaust valves, a longitudinal rod mounted slidably in a central bore in said shaft, the latter having slots opening from the inner and outer ends of said bore through the side of said shaft, an arm extending laterally from the inner end of said rod through the inner slot and secured to said collar, an additional arm extending laterally from the outer end of said rod through the outer slot, and means operatively associated with said second arm for shifting the same longitudinally of the shaft, whereby to shift said rod to slide the collar to different positions.

In testimony whereof we have hereunto set our hands in the presence of two subscribing witnesses.

WILLIAM PIERCE POSTELL.
JACOB FOREMAN HEARD, Jr.

Witnesses:
   Jno. F. Heard,
   T. Arthur Beoty.